(12) United States Patent
Eguchi (10) Patent No.: US 12,267,028 B2
(45) Date of Patent: Apr. 1, 2025

(54) CONTROL APPARATUS OF THREE-PHASE AC MOTOR

(71) Applicant: OKUMA Corporation, Aichi (JP)

(72) Inventor: Satoshi Eguchi, Aichi (JP)

(73) Assignee: OKUMA CORPORATION, Niwa-gun (JP)

(*) Notice: Subject to any disclaimer, the term of this patent is extended or adjusted under 35 U.S.C. 154(b) by 139 days.

(21) Appl. No.: 18/323,033

(22) Filed: May 24, 2023

(65) Prior Publication Data

US 2023/0396195 A1    Dec. 7, 2023

(30) Foreign Application Priority Data

Jun. 1, 2022 (JP) ................... 2022-089349

(51) Int. Cl.
| | |
|---|---|
| G05B 5/00 | (2006.01) |
| H02H 7/08 | (2006.01) |
| H02P 1/00 | (2006.01) |
| H02P 21/05 | (2006.01) |
| H02P 21/22 | (2016.01) |

(52) U.S. Cl.
CPC ............. *H02P 21/05* (2013.01); *H02P 21/22* (2016.02)

(58) Field of Classification Search
CPC ................................ H02P 21/05; H02P 21/22
USPC ........................................................ 318/448
See application file for complete search history.

(56) References Cited

U.S. PATENT DOCUMENTS

| | | | |
|---|---|---|---|
| 2013/0057186 A1* | 3/2013 | Tanabe | H02P 23/30 318/400.15 |
| 2014/0152205 A1* | 6/2014 | Nakai | H02P 21/22 318/400.02 |
| 2020/0059185 A1 | 2/2020 | Eguchi et al. | |

FOREIGN PATENT DOCUMENTS

JP    2019221105 A    12/2019

* cited by examiner

*Primary Examiner* — Erick D Glass
(74) *Attorney, Agent, or Firm* — CANTOR COLBURN LLP (57) ABSTRACT

A position control apparatus detects currents of processing object phases which flow through the three-phase AC motor, applies offset compensation processing to current detected values of the processing object phases based on offset compensation amounts, and controls the three-phase AC motor based on the current detected values of the processing object phases after the offset compensation processing. Processing of obtaining the offset compensation amounts includes processing of obtaining a Fourier coefficient of a frequency component of a torque ripple based on a torque command value signal, processing of obtaining torque amplitude components of the processing object phases, and processing of obtaining the offset compensation amounts with respect to the processing object phases based on the torque amplitude components of the processing object phases.

4 Claims, 6 Drawing Sheets

CONTROL APPARATUS OF THREE-PHASE AC MOTOR

CROSS REFERENCE TO RELATED APPLICATION

The present invention claims priority under 35 U.S.C. § 119 to Japanese Patent Application No. 2022-089349 filed on Jun. 1, 2022, the entire contents of which being incorporated herein by reference.

TECHNICAL FIELD

The present disclosure relates to current control of a motor when controlling a speed or a rotational angle of a feed axis or a spindle (position of a control object) in axis control of an NC machine tool or the like or when controlling a speed or a transmission torque of a control object in a general industrial machine with a three-phase AC motor such as a synchronous motor or an induction motor.

While an example of using the technique according to the present disclosure in axis control of an NC machine tool will be described in detail below, the technique according to the present disclosure is applicable to all applications that involve controlling a torque, a speed, and a position with a three-phase AC motor with high accuracy.

BACKGROUND

Generally, a three-phase AC motor (hereinafter, also simply referred to as an AC motor or a motor) is often adopted for axis control of an NC machine tool. In the three-phase AC motor, high torque controllability as an AC motor can be realized by arranging electric wires of a U phase, a V phase, and a W phase at electrical positions displaced by 120 degrees from each other and controlling a current of each phase with high accuracy.

Performing current control with high accuracy requires detecting a current of each phase with high accuracy over a wide frequency band. However, a (direct current-like) DC offset is superimposed on a current detection circuit due to conversion of high-frequency noise, a temperature drift, or the like and, as a result, pulsations (torque ripple) at a current frequency occur in a torque output.

Figure 6:
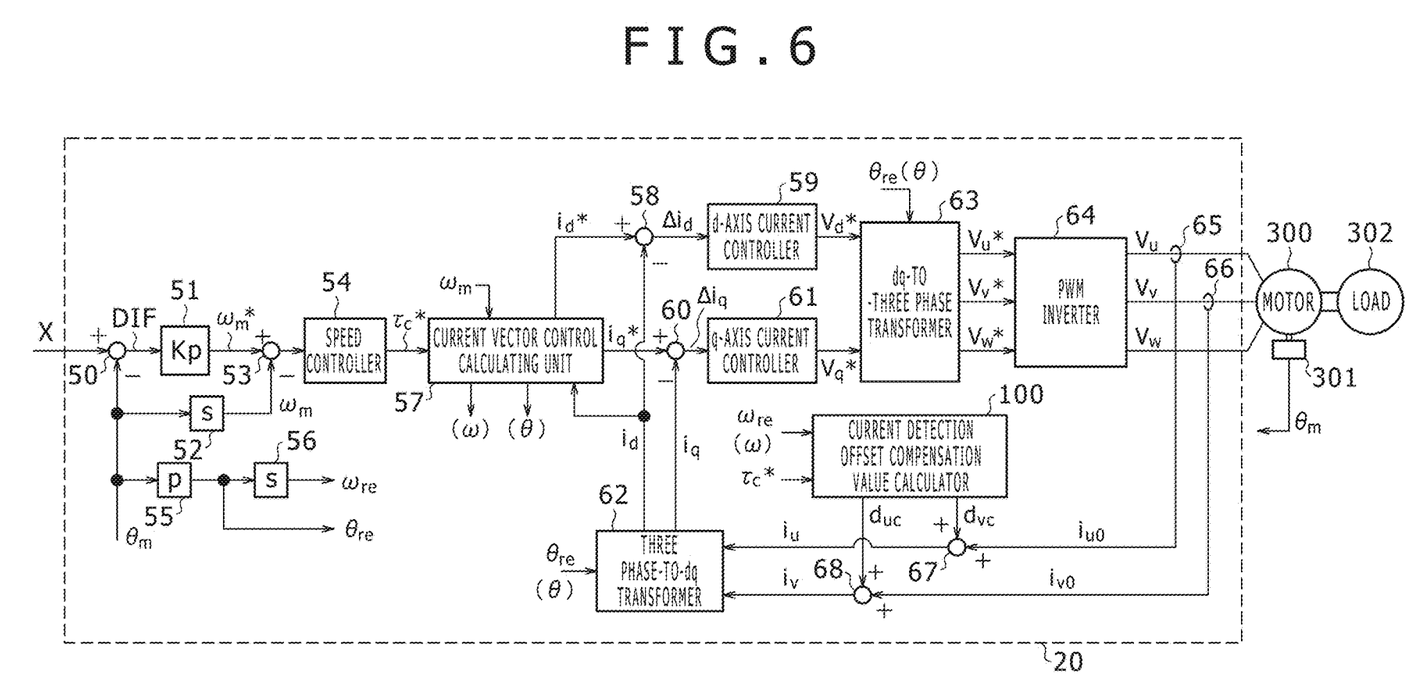
FIG. 6 is a block diagram showing a configuration example of a position control apparatus using a conventional three-phase AC motor as a drive motor.

FIG. 6 is a block diagram showing an example of a conventional position control apparatus 200 using a three-phase AC motor as a drive motor. Hereinafter, the position control apparatus 200 according to the present example will be described. A position command value X is output to the position control apparatus 200 according to the present example from a host apparatus or an upstream apparatus (not illustrated). A rotational angle θm of a motor 300 output from a position detector 301 fastened to the motor 300 is a position detected value indicating a position of a load 302 connected to and driven by the motor, the rotational angle θm is subtracted from the position command value X by a subtractor 50, and an output thereof becomes a position deviation DIF.

The position deviation DIF is amplified by a factor of Kp being a position loop gain by a position deviation amplifier 51, and a speed command value ωm* is output. Meanwhile, a differentiator 52 differentiates the position detected value θm by time and outputs a speed detected value ωm. A subtractor 53 subtracts the speed detected value ωm from the speed command value ωm*, and a speed deviation being an output of the subtractor 53 is PI (proportional integral)-amplified by a speed controller 54. An output of the speed controller 54 becomes a torque command value τc*.

In the case of a permanent magnet synchronous motor (generally, classified into a surface permanent magnet synchronous motor (SPMSM) and an interior permanent magnet synchronous motor (IPMSM)) or a synchronous reluctance motor (SynRM), a current vector control calculating unit 57 calculates and outputs a q-axis current command value iq* and a d-axis current command value id* with respect to the torque command value τc* of the motor from N-τ (speed-torque) characteristics of the motor, the speed detected value ωm, and the like.

On the other hand, in the case of an induction motor (IM), the current vector control calculating unit 57 calculates and outputs the d-axis current command value id* from field-weakening characteristics of the induction motor and the speed detected value ωm and calculates and outputs the q-axis current command value iq* from the torque command value τc* and the d-axis current command value id*. Furthermore, the current vector control calculating unit 57 calculates a slip angular velocity ωs from the d-axis current command value id* and the q-axis current command value iq* and adds (not illustrated) the slip angular velocity ωs to an electrical angular velocity ωre to be described later to calculate and output a current angular velocity ω and a current phase angle θ being a time integral of the current angular velocity ω.

The position detected value θm is multiplied by the number of polar pairs p of the motor by a multiplier 55 and becomes an electrical angle θre. A differentiator 56 differentiates the electrical angle θre with respect to time and outputs the electrical angular velocity ωre. (Usually, in a synchronous motor, electrical angular velocity ωre=current angular velocity ω is satisfied). A U-phase current iu0 and a V-phase current iv0 of the motor are detected by a U-phase current detection circuit 65 and a V-phase current detection circuit 66. The DC offset described earlier is superimposed on each phase current detected value.

A current detection offset compensation value adjuster 100 adjusts and outputs a U-phase offset compensation amount duc and a V-phase offset compensation amount dvc from the electrical angular velocity ωre (the current angular velocity ω in the case of an IM) and the torque command value τc*. An adder 67 adds up iu0 and duc and outputs a U-phase current iu. In a similar manner, an adder 68 adds up iv0 and dvc and outputs a V-phase current iv.

Note that a W-phase current iw can be calculated by iw=−(iu+iv). In this manner, since three-phase currents satisfy iu+iv+iw=0, usually, two phases out of three phases are detected and the remaining phase is calculated by an arithmetic operation. A three phase-to-dq transformer 62 calculates and outputs, from the U-phase current iu, the V-phase current iv, and the electrical angle θre (the current phase angle θ in the case of an IM), a d-axis current detected value id and a q-axis current detected value iq, by coordinate transformation.

A subtractor 58 subtracts the d-axis current detected value id from the d-axis current command value id* to calculate a d-axis current error Δid. A d-axis current controller 59 is constituted of an error amplifier which PI (proportional integral)-amplifies the d-axis current error Δid and a decoupling compensation unit (not illustrated) which compensates for an interference component with the q axis. The d-axis current controller 59 adds up the error amplifier output and the decoupling compensation value and outputs a d-axis voltage command value vd*.

A subtractor 60 subtracts the q-axis current detected value iq from the q-axis current command value iq* to calculate a q-axis current error Δiq. A q-axis current controller 61 is constituted of an error amplifier which PI (proportional integral)-amplifies the q-axis current error Δiq, a decoupling compensation unit (not illustrated) which compensates for an interference component with the d axis, and an induced voltage compensation unit (not illustrated) which compensates for an induced voltage of the motor. The q-axis current controller 61 adds up the error amplifier output, the decoupling compensation value, and the induced voltage compensation value and outputs a q-axis voltage command value vq*.

A dq-to-three phase transformer 63 calculates and outputs, from the d-axis voltage command value vd*, the q-axis voltage command value vq*, and the electrical angle θre (the current phase angle θ in the case of an IM), a U-phase voltage command value vu*, a V-phase voltage command value vv*, and a W-phase voltage command value vw*, by coordinate transformation.

A PWM inverter 64 receives the respective phase control voltage command values (vu*, vv*, and vw*) as input, power-amplifies the phase control voltage command values, and outputs phase voltages (vu, vv, vw) of motor drive. Each output phase voltage is applied to the respective phase of the motor and each phase current is generated.

Figure 7:
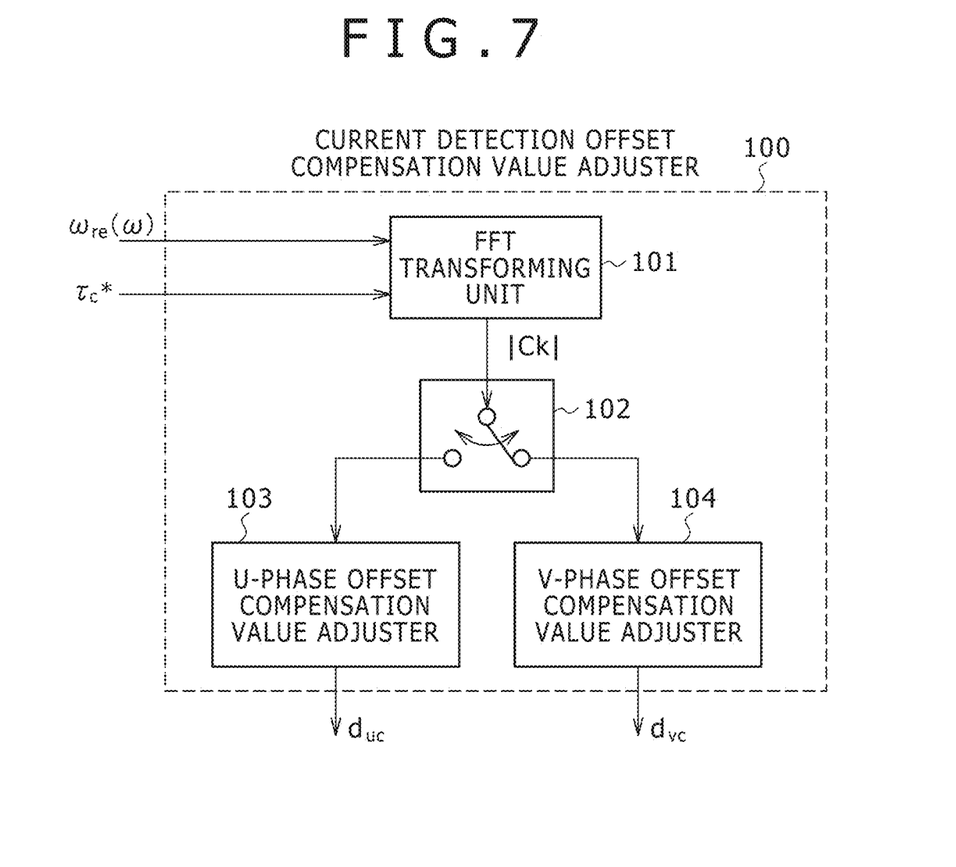
FIG. 7 is a block diagram showing an example of a configuration of a conventional current detection offset compensation value adjuster.

FIG. 7 is a block diagram showing an example of a configuration of the conventional current detection offset compensation value adjuster 100. The electrical angular velocity ωre (the current angular velocity ω in the case of an IM) and the torque command value τc* are input to an FFT transforming unit 101. Since a DC offset to be superimposed on current detection is converted into a torque ripple having an angular frequency of the electrical angular velocity core (the current angular velocity ω in the case of an IM), the FFT transforming unit 101 outputs an absolute value of a Fourier coefficient |Ck| which corresponds to a torque ripple amplitude of the angular frequency component.

A selector 102 is a selector which determines either to adjust an offset compensation amount of U-phase current detection or to adjust an offset compensation amount of V-phase current detection. First, when the U-phase side is selected, a U-phase offset compensation value adjuster 103 searches for a U-phase current detection offset compensation amount duc which provides a minimum value of the torque ripple amplitude |Ck| of the electrical angular velocity ωre (ω in the case of an IM) while changing duc by a specific pitch.

Next, the V-phase side is selected. A V-phase offset compensation value adjuster 104 searches for a V-phase current detection offset compensation amount dvc which provides a minimum value of the torque ripple amplitude |Ck| of the electrical angular velocity ωre (ω in the case of an IM) while changing dvc by a specific pitch. By repeating such a paired operation of the U-phase side and the V-phase side for several cycles while reducing the search pitch, offset compensation amounts which cancel or suppress the superimposed DC offsets are finally calculated and output.

While an example of an operation algorithm of conventional current detection offset compensation has been described above, since a search-like algorithm which requires such phase selections does not enable respective phases to be calculated at the same time, there are cases where a suitable offset compensation amount cannot be calculated, such as in a state where a magnitude of a torque ripple constantly fluctuates or when a difference between DC offsets to be superimposed on current detection in the respective phases is significantly large.

JP 2019-221105 A describes a technique for reducing a torque ripple attributable to an offset error of a current sensor of a three-phase AC motor as a technique related to the present disclosure.

SUMMARY

Technical Problem

An object of the present disclosure is to promptly suppress a current detection DC offset of each phase of a three-phase AC motor. In addition, an embodiment provides a control apparatus of a three-phase AC motor equipped with a current detection offset compensation value calculator capable of minimizing a magnitude of a torque ripple of an angular frequency of an electrical angular velocity ωre (a current angular velocity ω in the case of an IM) attributable to a DC offset to be superimposed on current detection, by calculating and outputting optimal offset compensation amounts for respective phases at the same time even in a state where the magnitude of the torque ripple constantly fluctuates or when a difference between current detection DC offsets of the respective phases is significantly large.

Solution to Problem

The present disclosure detects currents of processing object phases being at least two phases among currents of three phases which flow through a three-phase AC motor, applies offset compensation processing with respect to a current detected value of the processing object phases based on offset compensation amounts obtained in advance, and controls the three-phase AC motor based on the current detected values of the processing object phases after the offset compensation processing, wherein the processing of obtaining the offset compensation amounts includes: processing of obtaining a Fourier coefficient of a frequency component of a torque ripple with respect to a torque command value signal to the three-phase AC motor; processing of obtaining torque amplitude components of the processing object phases of the three-phase AC motor based on the Fourier coefficient and an electrical angle of the three-phase AC motor at a reference time of the torque command value signal; and processing of obtaining the offset compensation amounts with respect to the processing object phases based on the torque amplitude components of the processing object phases.

In an embodiment, the processing of obtaining the offset compensation amounts includes: processing of obtaining, based on the torque amplitude components of the processing object phases, offset compensation change amounts with respect to the offset compensation amounts previously obtained with respect to the processing object phases, and obtaining new offset compensation amounts with respect to the processing object phases based on the offset compensation change amounts with respect to the processing object phases and the offset compensation amounts previously obtained with respect to the processing object phases.

In an embodiment, the torque command value signal indicates a torque command value with respect to the three-phase AC motor rotating at a constant speed.

In an embodiment, a control apparatus of a torque, a speed, and a position of a three-phase AC motor is equipped with a current detection offset compensation value calculator which simultaneously derives a torque ripple amplitude attributable to a DC offset error to be superimposed on current detection of any one phase and a torque ripple amplitude attributable to a DC offset error to be superimposed on current detection of one of the other two phases from a Fourier coefficient with respect to a torque ripple of a current frequency component calculated from a torque command value signal sampled and collected by having the three-phase AC motor rotate at a constant speed and from a current phase at the start of sampling and which calculates a current detection offset error compensation amount of each phase from the torque ripple amplitudes to correct the current detection.

In addition, an embodiment is equipped with a current detection offset compensation value calculator having an algorithm which causes a torque ripple to gradually decrease and converge by repetitively performing the calculation of the current detection offset error compensation amount for a plurality of cycles.

In an embodiment of the present disclosure, an amplitude and a phase of a torque ripple of an angular frequency of an electrical angular velocity ωre (a current angular velocity ω in the case of an IM) attributable to a DC offset to be superimposed on current detection are detected simultaneously and at high speed as a Fourier coefficient C1. A polarity and a relative ratio of a current detection offset of each phase are analytically obtained from the Fourier coefficient C1, and a current detection offset compensation value increment of each phase is calculated. This calculation cycle is repeated to cause the offset compensation amount of each phase to gradually converge to an optimal value.

According to the present disclosure, a current detection DC offset of each phase may be promptly suppressed. In addition, in a position control apparatus of a three-phase AC motor according to an embodiment of the present disclosure, a DC offset to be superimposed on current detection of each phase which may cause a torque ripple of an angular frequency of an electrical angular velocity ωre (a current angular velocity ω in the case of an IM) may be canceled or suppressed by an offset compensation amount obtained at high speed and simultaneously for the respective phases by an analytical algorithm. Therefore, the offset compensation amount of each phase may be optimized, and a magnitude of a torque ripple may be minimized even in a state where a magnitude of the torque ripple constantly fluctuates or when a difference between DC offsets of the respective phases is significantly large. Note that the technique according to the present disclosure is applicable to all applications that involve controlling a torque, a speed, and a position with a three-phase AC motor with high accuracy and similar advantageous effects may be appreciated.

BRIEF DESCRIPTION OF DRAWINGS

An embodiment of the present disclosure will be described based on the following figures, wherein.

DESCRIPTION OF EMBODIMENT

Figure 1:
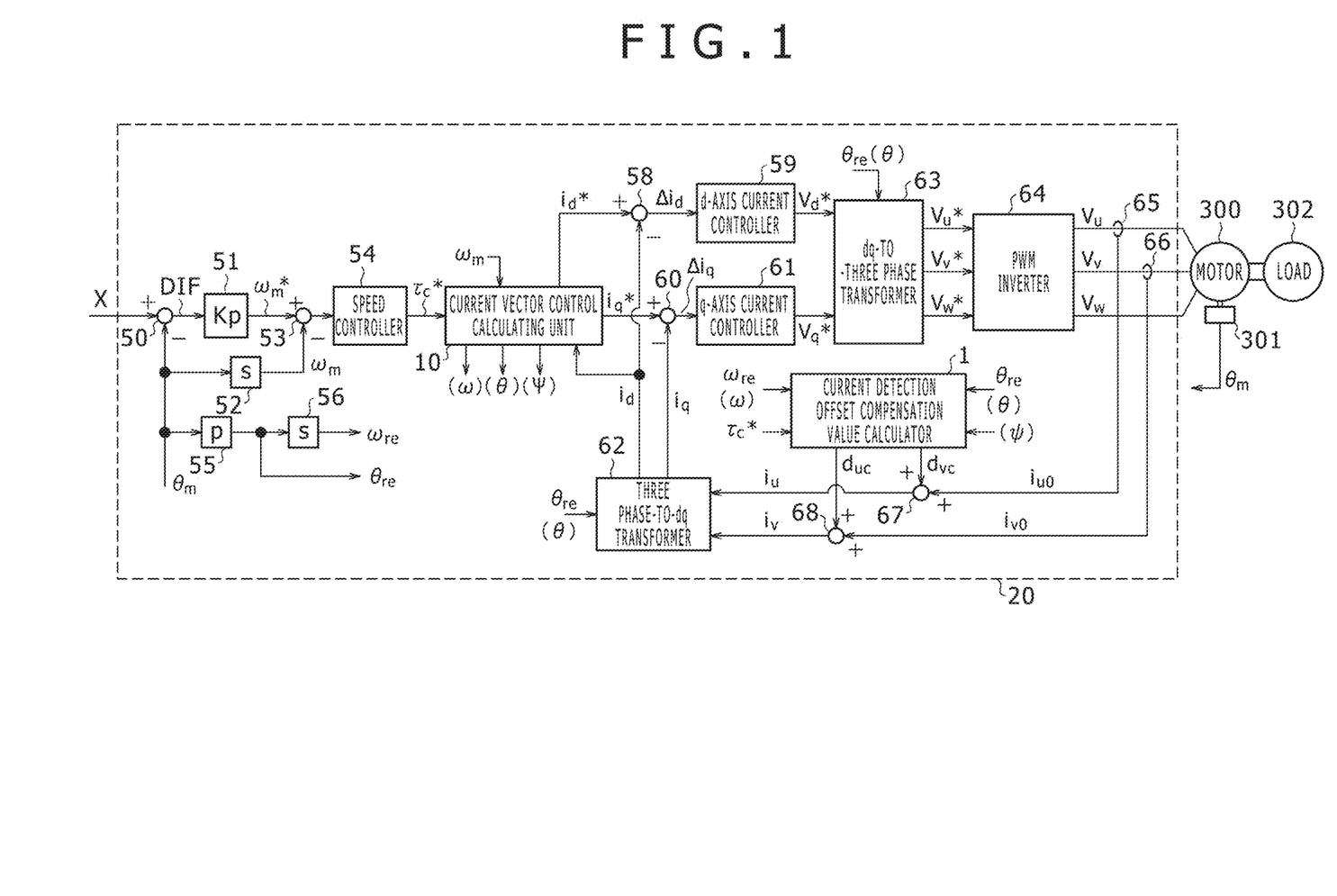
FIG. 1 is a block diagram showing a configuration example of a position control apparatus using the three-phase AC motor according to the present disclosure as a drive motor.

A best mode for carrying out the present disclosure will be described using examples. FIG. 1 is a block diagram showing an example of an approximate configuration of a position control apparatus 20 of a three-phase AC motor according to the present disclosure. Constituent elements that are the same as the constituent elements shown in FIG. 6 will be denoted by same reference signs and a description thereof will be simplified. The position control apparatus 20 may be constituted by a processor, a digital electronic circuit, or an analog electronic circuit which realizes a function of each constituent element by executing a program.

First, a relationship between a DC offset to be superimposed on current detection of each phase and a torque ripple Trip attributable to the DC offset will be specified. In permanent magnet synchronous motors (SPMSM and IPMSM), a torque can be generated between a permanent magnet field and a q-axis current iq even when a d-axis current command value id*=0. In this case, by denoting current detection DC offsets of the U phase and the V phase as du and dv, the three phase currents iu, iv, and iw when the motor rotates at a constant speed of an electrical angular velocity ωre are expressed by Formula (1). Note that in the present specification, a sin function will be notated as "S" and a cos function will be notated as "C" for the sake of brevity.

[Expression 1]

$$\begin{cases} i_u = \text{Is} \cdot C_{\theta re} + d_u \\ i_v = \text{Is} \cdot C_{(\theta re - 2\pi/3)} + d_v \\ i_w = \text{Is} \cdot C_{(\theta re + 2\pi/3)} - (d_u + d_v) \end{cases} \quad (1)$$

where Is denotes a phase current amplitude.

According to the three phase-to-dq transformer 62, the q-axis current iq is expressed as Formula (2).

[Expression 2]

$$\begin{aligned} i_q &= \sqrt{\frac{2}{3}} \left\{ i_u \cdot C_{\theta re} + i_v \cdot C_{(\theta re - 2\pi/3)} + i_w \cdot C_{(\theta re + 2\pi/3)} \right\} \\ &= \sqrt{\frac{2}{3}} \left\{ \frac{3}{2} \text{Is} + d_u \left( C_{\theta re} - C_{(\theta re + 2\pi/3)} \right) + \right. \\ &\quad \left. d_v \left( C_{(\theta re - 2\pi/3)} - C_{(\theta re + 2\pi/3)} \right) \right\} \\ &= \sqrt{\frac{2}{3}} \left\{ \frac{3}{2} \text{Is} + \sqrt{3} \cdot d_u S_{(\theta re + \pi/3)} + \sqrt{3} \cdot d_v S_{(\theta re)} \right\} \end{aligned} \quad (2)$$

In the case of an SPMSM, a generated torque τ is a magnetic torque proportional to the q-axis current iq (τ∝iq).

In particular, a torque ripple τrip attributable to current detection DC offsets du and dv can be expressed by Formula (3).

[Expression 3]

$$\tau rip = A\{d_u S_{(\theta re+\pi/3)} + d_v S_{(\theta re)}\} \quad (3)$$

where A denotes a constant (A>0) for matching units between τrip and du, dv.

In other words, the current detection DC offsets du and dv are converted to the torque ripple τrip having an angular frequency of an electrical angular velocity ωre (=p·ωm).

On the other hand, according to the three phase-to-dq transformer 62, the d-axis current id is expressed as Formula (4).

[Expression 4]

$$\begin{aligned} i_d &= \sqrt{\frac{2}{3}} \{i_u \cdot S_{\theta re} + i_v \cdot S_{(\theta re-2\pi/3)} + i_w \cdot S_{(\theta re+2\pi/3)}\} \\ &= \sqrt{\frac{2}{3}} \{d_u S_{\theta re} + d_v S_{(\theta re-2\pi/3)} - (d_u + d_v) S_{(\theta re+2\pi/3)}\} \end{aligned} \quad (4)$$

A reluctance torque τr of an IPMSM is proportional to iq·id (τr∝iq·id). Since a squared term of a current detection DC offset is small, by ignoring the squared term, we obtain Formula (5).

[Expression 5]

$$\begin{aligned} \tau r \propto i_q \cdot i_d &\approx Is\{d_u S_{\theta re} + d_v S_{(\theta re-2\pi/3)} - (d_u + d_v) S_{(\theta re+2\pi/3)}\} \\ &= Is\{d_u S_{(\theta re+\pi/3)} + d_v S_{(\theta re)}\} \end{aligned} \quad (5)$$

This is a constant multiple of the magnet torque ripple τrip of Formula (3). In other words, a torque ripple of a total torque (=magnet torque+reluctance torque) of an IPMSM can also be expressed by Formula (3) in a similar manner to an SPMSM.

Figure 2:
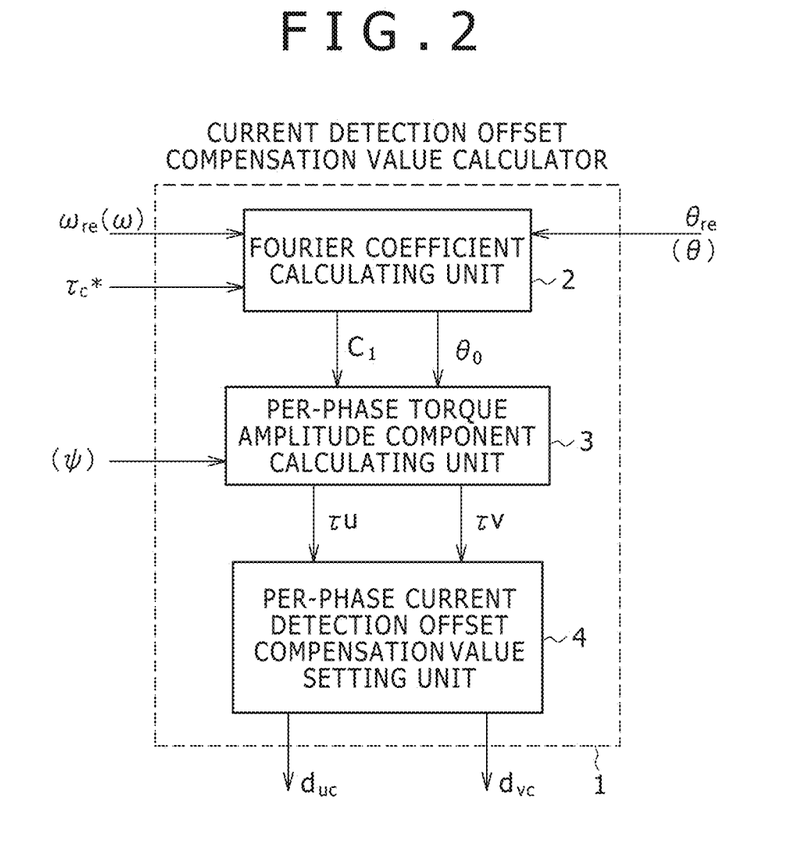
FIG. 2 is a block diagram showing an example of a current detection offset compensation value calculator according to the present disclosure.
Figure 3:
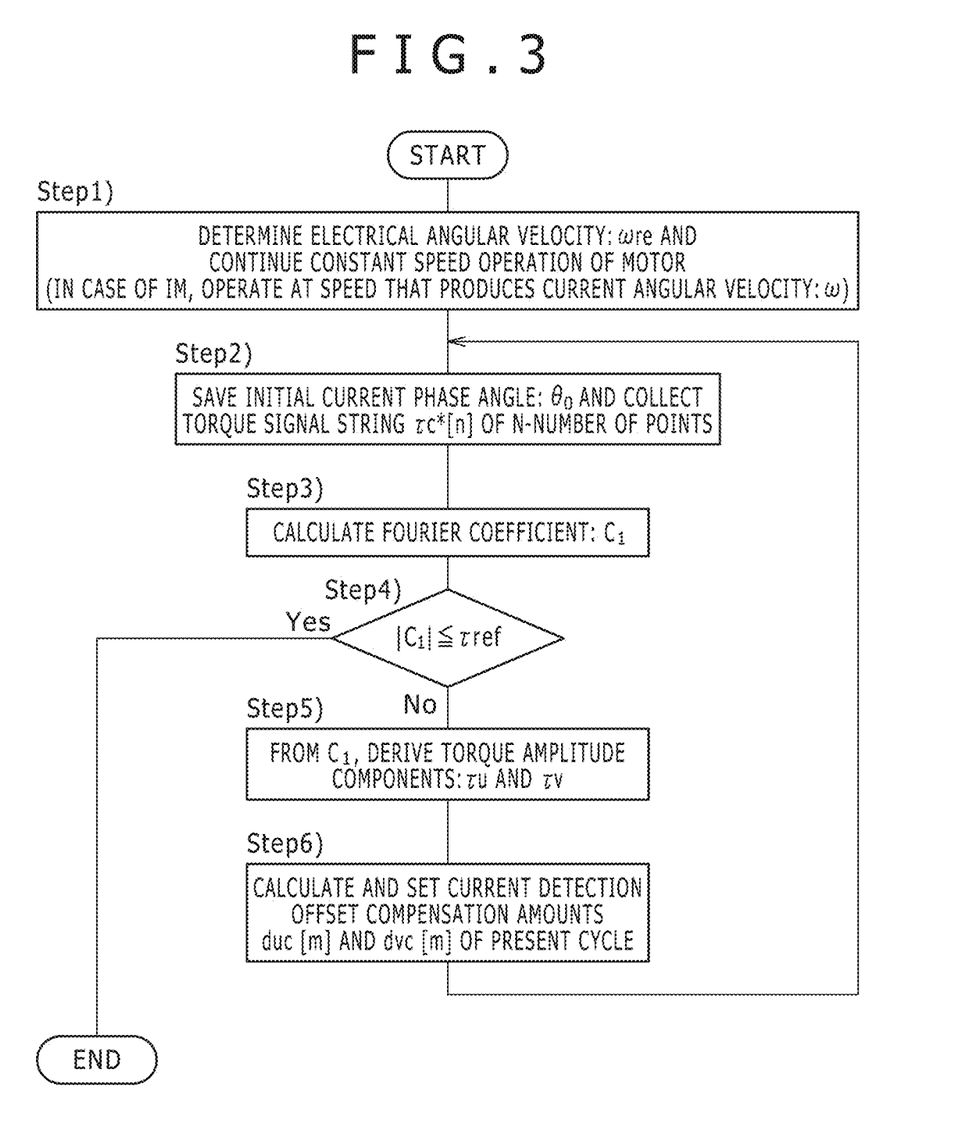
FIG. 3 is a flow chart for describing an operation sequence of the current detection offset compensation value calculator.

FIG. 2 is a block diagram showing an example of a configuration of a current detection offset compensation value calculator 1 according to the present disclosure shown in FIG. 1. Hereinafter, an operation of the current detection offset compensation value calculator 1 will be described. FIG. 3 is a flow chart for describing each step of an operation sequence of the current detection offset compensation value calculator 1.

(Step 1). An electrical angular velocity ωre and the total number of sampling points N that satisfy Formula (6) are selected among a velocity range where a large torque ripple attributable to a current detection DC offset is generated, and the motor is operated at a constant velocity ωre under id*=0.

[Expression 6]

$$\omega_{re} Ts \cdot N = 2\pi \quad (6)$$

where Ts denotes a sampling period.

(Step 2). A torque command value τc*[n] of N-number of points is collected at the sampling period Ts.
An electrical angle θre at c*[0] is saved as θ0.

(Step 3) A Fourier coefficient C1 of a fundamental wave component of a known discrete Fourier transform (DFT) is calculated from Formula (7).

$$C_1 = \frac{1}{N} \sum_{n=0}^{N-1} \tau_c^*[n] e^{-j(2\pi/N)n} \quad (7)$$

(Step 2) and (Step 3) become operations of a Fourier coefficient calculating unit 2 shown in FIG. 2.

Figure 4:
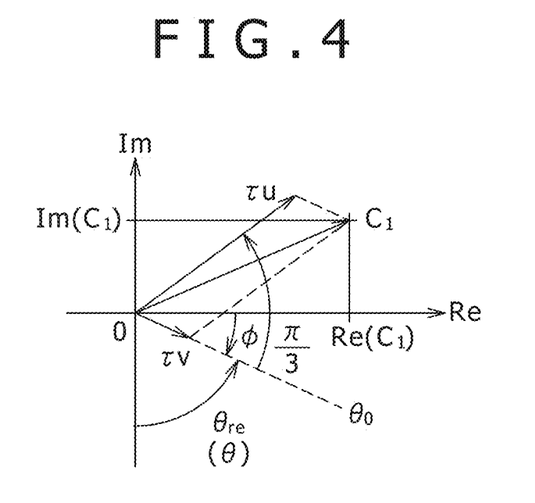
FIG. 4 is a vector diagram of a Fourier coefficient C1 at a torque ripple frequency of a permanent magnet synchronous motor.

From Formula (3), the torque ripple τrip of the electrical angular velocity ωre is a combination of a torque amplitude component τu attributable to du and a torque amplitude component τv attributable to dv and has a relationship with the Fourier coefficient C1 as shown in FIG. 4.

The torque ripple τrip of Formula (3) can be notated by Formula (8) using the torque amplitude components τu and τv described above.

[Expression 8]

$$\tau rip = B\{\tau_u S_{(\theta re+\pi/3)} + \tau_v S_{(\theta re)}\} \quad (8)$$

where B denotes a constant (B>0) for matching units between τrip and τu, τv.

(Step 5). τu and τv shown in FIG. 4 have a relationship with the Fourier coefficient C1 that is represented by Formula (9.1) and Formula (9.2).

[Expression 9]

$$\begin{cases} \text{Re}(C_1) = \tau u \cdot C_{(\pi/3+\phi)} + \tau v \cdot C_\phi & (9.1) \\ \text{Im}(C_1) = \tau u \cdot S_{(\pi/3+\phi)} + \tau v \cdot S_\phi & (9.2) \\ \text{where } \phi = \theta_0 - \frac{\pi}{2} \end{cases}$$

Solving these simultaneous equations enable τu and τv shown in FIG. 4 to be expressed by Formula (10).

[Expression 10]

$$\begin{cases} \tau u = -\dfrac{\text{Re}(C_1)S_\phi - \text{Im}(C_1)C_\phi}{(\sqrt{3}/2)} \\ \tau v = \dfrac{\text{Re}(C_1)S(\pi/3+\phi) - \text{Im}(C_1)C(\pi/3+\phi)}{(\sqrt{3}/2)} \end{cases} \quad (10)$$

(Step 5) becomes an operation of a per-phase torque amplitude component calculating unit 3 shown in FIG. 2.

(Step 6). Current detection offset compensation increments Δduc and Δdvc are calculated from the derived τu and τv by Formula (11).

[Expression 11]

$$\begin{cases} \Delta duc = -G \cdot \tau u \\ \Delta dvc = -G \cdot \tau v \end{cases} \quad (11)$$

where a gain G is a constant within a range of 0<G≤B/A.

The current detection offset compensation amounts duc [m] and dvc [m] of the present cycle (m-th cycle) are represented by the current detection offset compensation amounts duc [m−1] and dvc [m−1] of the previous cycle (m−1-th cycle) and the current detection offset compensation increments Δduc and Δdvc. In other words, the current detection offset compensation amounts duc [m] and dvc [m] of the present cycle (m-th cycle) operate to cause the torque ripple to gradually converge to 0 according to Formula (12).

[Expression 12]

$$\begin{cases} duc\,[m] = \Delta\,duc + duc\,[m-1] \\ dvc\,[m] = \Delta\,dvc + dvc\,[m-1] \end{cases} \quad (12)$$

(Step 6) becomes an operation of a per-phase current detection offset compensation value setting unit 4 shown in FIG. 2.

As described above, the position control apparatus 20 according to the embodiment of the present disclosure detects currents of two phases (the U phase and the V phase) among the currents of three phases which flow through the three-phase AC motor, applies offset compensation processing to the current detected values of the two phases based on offset compensation amounts obtained in advance, and controls the three-phase AC motor based on the current detected values of the two phases after the offset compensation processing.

The processing of obtaining the offset compensation amounts includes processing of obtaining a Fourier coefficient C1 of a frequency component of a torque ripple with respect to a torque command value signal (the torque command value signal τc* [n]) to the three-phase AC motor. The torque command value signal may be a signal indicating a torque command value with respect to the three-phase AC motor rotating at a constant speed. In addition, the processing of obtaining the offset compensation amounts duc [m] and dvc [m] includes processing of obtaining torque amplitude components (τu and τv) of the two phases of the three-phase AC motor. The processing of obtaining the torque amplitude components of the two phases includes processing of obtaining the torque amplitude components (τu and τv) of the two phases based on the Fourier coefficient C1 and an electrical angle θ0 of the three-phase AC motor at a reference time (n=0) of the torque command value signal τc* [n]. Furthermore, the processing of obtaining the offset compensation amounts includes processing of obtaining the offset compensation amounts duc [m] and dvc [m] with respect to the two phases based on the torque amplitude components (τu and τv) of the two phases.

In addition, the processing of obtaining the offset compensation amounts duc [m] and dvc [m] includes: processing of obtaining, based on the torque amplitude components (τu and τv) of the two phases, offset compensation change amounts (offset compensation increments Δduc and Δdvc) with respect to offset compensation amounts duc [m−1] and dvc [m−1] previously obtained with respect to the two phases, and obtaining new offset compensation amounts duc [m] and dvc [m] with respect to the two phases based on the offset compensation change amounts with respect to the two phases and the offset compensation amounts duc [m−1] and dvc [m−1] previously obtained with respect to the two phases. While an example in which the U phase and the V phase are direct processing objects and processing of the W phase is executed based on calculation results of the U phase and the V phase has been demonstrated, all three phases being the U phase, the V phase, and the W phase may be phases that are direct processing objects (processing object phases).

While this concludes the description of operations of the current detection offset compensation value calculator 1, as shown in (Step 4) in FIG. 3, after calculating the Fourier coefficient C1 in (Step 3), a magnitude |C1| of the Fourier coefficient and a convergence reference value τref of the torque ripple amplitude are compared with each other, the operation sequence from (Step 2) to (Step 6) is executed until |C1|≤τref is satisfied, and the calculation of the current detection offset compensation values duc and dvc is repeated. Once |C1|≤τref is satisfied, the calculation of the current detection offset compensation values duc and dvc is completed and the constant-speed operation of the motor is ended.

The description of the series of operations thus far concerns a case of permanent magnet synchronous motors (SPMSM and IPMSM). Next, operations of the current detection offset compensation value calculator 1 in the cases of an induction motor (IM) or a synchronous reluctance motor (SynRM) will be described with a focus on differences from the case of permanent magnet synchronous motors (SPMSM and IPMSM). In the case of an IM or a SynRM, since torque is generated between the q-axis current iq and the d-axis current id (τ∝iq·id), d-axis current command value id*≠0 becomes a prerequisite.

In consideration thereof, in a current vector control calculating unit 10 shown in FIG. 1, after calculating the q-axis current command value iq* and the d-axis current command value id*, a vector synthesis current I of iq* and id* is obtained and an angle Ψ formed between I and id* is calculated.

In the case of an IM or a SynRM, the relationship between the current detection DC offsets du and dv and the three-phase currents iu, iv, and iw when the motor rotates at a constant speed of the current angular velocity ω (the electrical angular velocity ωre in the case of a SynRM) can be represented by Formula (13) using the angle Ψ formed between I and id*.

[Expression 13]

$$\begin{cases} i_u = Is \cdot S_{(\theta+\phi)} + d_u \\ i_v = Is \cdot S_{(\theta-2\pi/3+\phi)} + d_v \\ i_w = Is \cdot S_{(\theta+2\pi/3+\phi)} - (d_u + d_v) \end{cases} \quad (13)$$

Hereinafter, a SynRM will be described as an example. (Since the SynRM is a synchronous motor, current angular velocity ω→electrical angular velocity ωre is satisfied).

According to the three phase-to-dq transformer 62, the q-axis current iq is expressed as Formula (14) and the d-axis current id is expressed as Formula (15).

[Expression 14]

$$\begin{aligned} i_q &= \sqrt{\frac{2}{3}}\left\{i_u \cdot C_{\theta re} + i_v \cdot C_{(\theta re-2\pi/3)} + i_w \cdot C_{(\theta re+2\pi/3)}\right\} \\ &= \sqrt{\frac{2}{3}}\left\{\frac{3}{2}\mathrm{Is} \cdot S_\phi + d_u C_{\theta re} + d_v C_{(\theta re-2\pi/3)} - (d_u+d_v)C_{(\theta re+2\pi/3)}\right\} \end{aligned} \quad (14)$$

[Expression 15]

$$\begin{aligned} i_d &= \sqrt{\frac{2}{3}}\left\{i_u \cdot S_{\theta re} + i_v \cdot S_{(\theta re-2\pi/3)} + i_w \cdot S_{(\theta re+2\pi/3)}\right\} \\ &= \sqrt{\frac{2}{3}}\left\{\frac{3}{2}\mathrm{Is} \cdot C_\phi + d_u S_{\theta re} + d_v S_{(\theta re-2\pi/3)} - (d_u+d_v)S_{(\theta re+2\pi/3)}\right\} \end{aligned} \quad (15)$$

At this point, by ignoring a minute square term of the current detection DC offset and calculating a generated torque τ, we obtain Formula (16).

[Expression 16]

$$\tau \propto iq \cdot id \fallingdotseq$$

$$\frac{3}{2}\text{Is}^2 \cdot S_\phi C_\phi + \text{Is} \cdot d_u \{S_\phi S_{\theta re} + C_\phi C_{\theta re} - S_\phi S_{(\theta re+2\pi/3)} - C_\phi C_{(\theta re+2\pi/3)}\} +$$

$$\text{Is} \cdot d_v \{S_\phi S_{(\theta re-2\pi/3)} + C_\phi C_{(\theta re-2\pi/3)} - S_\phi S_{(\theta re+2\pi/3)} - C_\phi C_{(\theta re+2\pi/3)}\} =$$

$$\frac{3}{2}\text{Is}^2 \cdot S_\phi C_\phi + \sqrt{3} \cdot \text{Is} \cdot d_u S_{(\theta re+\pi/3-\phi)} + \sqrt{3} \cdot \text{Is} \cdot d_v S_{(\theta re-\phi)}$$

(16)

In particular, a torque ripple Trip attributable to current detection DC offsets du and dv can be expressed by Formula (17).

[Expression 17]

$$\tau rip \approx A(d_u S_{(\theta re+\pi/3-\Psi)} + d_v S_{(\theta re-\Psi)})$$ (7)

where A denotes a constant (A>0) for matching units between τrip and du, dv in the case of a SynRM, and although A differs from A in Formula (3), the expression A will be used for the sake of convenience. In other words, even in the case of a SynRM, the current detection DC offsets are converted to the torque ripple τrip having an angular frequency of an electrical angular velocity ωre.

Next, an operation sequence (Steps) of the current detection offset compensation value calculator 1 in the case of a SynRM will be described. The sequence up to (Step 3) is the same as in the case of permanent magnet synchronous motors (SPMSM and IPMSM). In the case of a SynRM, the relationship between the torque amplitude components τu and τv and the Fourier coefficient C1 is a relationship shown in FIG. 5.

Therefore, the torque ripple Trip of Formula (17) can be notated by Formula (18) using the torque amplitude components τu and τv.

[Expression 18]

$$\tau rip \approx B\{\tau_u S_{(\theta re+\pi/3-\Psi)} + \tau_v S_{(\theta re-\Psi)}\}$$ (18)

where B denotes a constant (B>0) for matching units between τrip and τu, τv in the case of a SynRM, and although B differs from B in Formula (8), the expression B will be used for the sake of convenience.

Figure 5:
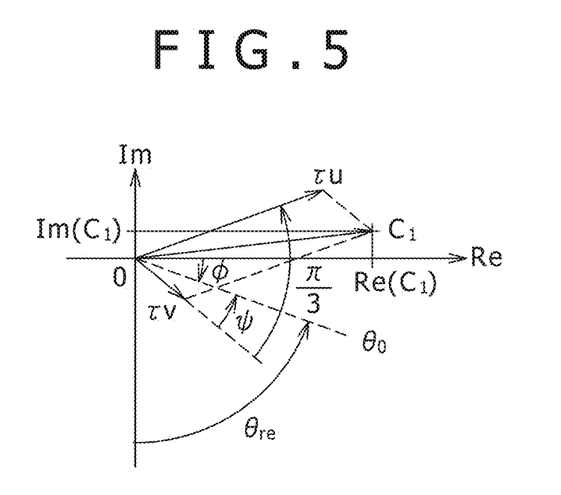
FIG. 5 is a vector diagram of the Fourier coefficient C1 at a torque ripple frequency of an induction motor or a synchronous reluctance motor.

Since the relationship between τu and τv and the Fourier coefficient C1 is shown in FIG. 5, a relationship expressed by Formula (19.1) and Formula (19.2) is satisfied.

[Expression 19]

$$\begin{cases} \text{Re}(C_1) = \tau u \cdot C_{(\pi/3+\phi-\phi)} + \tau v \cdot C_{(\phi-\phi)} & (19.1) \\ \text{Im}(C_1) = \tau u \cdot S_{(\pi/3+\phi-\phi)} + \tau v \cdot S_{(\phi-\phi)} & (19.2) \\ \text{where } \phi = \theta_0 - \frac{\pi}{2} \end{cases}$$

Solving these simultaneous equations enable τu and τv shown in FIG. 5 to be expressed by Formula (20).

[Expression 20]

$$\begin{cases} \tau u = -\frac{\text{Re}(C_1)S_{(\phi-\phi)} - \text{Im}(C_1)C_{(\phi-\phi)}}{(\sqrt{3}/2)} \\ \tau v = \frac{\text{Re}(C_1)S(\pi/3+\phi-\phi) - \text{Im}(C_1)C(\pi/3+\phi-\phi)}{(\sqrt{3}/2)} \end{cases}$$ (20)

In other words, in a SynRM, the sequence of (Step 5) which is an operation of the per-phase torque amplitude component calculating unit 3 shown in FIG. 2 is executed based on Formula (20). Thereafter, the sequence of (Step 6) and (Step 4) is the same as in the case of permanent magnet synchronous motors (SPMSM and IPMSM) described earlier.

Next, a case of an IM will be described. The relationship between the current detection DC offsets du and dv and the three-phase currents iu, iv, and iw when the motor rotates at a constant speed of the current angular velocity ω can be represented by Formula (13) described earlier using the angle Ψ formed between I and id*. According to the three phase-to-dq transformer 62, the q-axis current iq is expressed as Formula (21).

[Expression 21]

$$i_q = \sqrt{\frac{2}{3}} \{i_u \cdot C_\theta + i_v \cdot C_{(\theta-2\pi/3)} + i_w \cdot C_{(\theta+2\pi/3)}\}$$

$$\sqrt{\frac{3}{2}} \text{Is} \cdot S_\phi + \sqrt{2}(d_u S_{(\theta+\pi/3)} + d_v S_{(\theta)})$$

(21)

Note that under a constant speed in the case of an IM, id* is set to a constant value, and even when a current detection DC offset is present, the d-axis current id is controlled to id*=id. Therefore, the torque ripple Trip is proportional to a ripple component of the q-axis current iq in a similar manner to a case of an SPMSM and can be expressed by Formula (22).

[Expression 22]

$$\tau rip \approx A\{d_u S_{(\theta+\pi/3)} + d_v S_{(\theta)}\}$$ (22)

where A denotes a constant (A>0) for matching units between τrip and du, dv in the case of an IM, and in the case of an IM, the current detection DC offsets are converted to the torque ripple τrip having an angular frequency of a current angular velocity ω.

Next, an operation sequence (Steps) of the current detection offset compensation value calculator 1 in the case of an IM will be described. The sequence up to (Step 3) represents the same operations, provided that the electrical angular velocity ωre are replaced with the current angular velocity ω. However, in the case of an IM, since there is a difference in slip angular velocity ωs between the current angular velocity ω and the electrical angular velocity ωre, when a load is heavy, the motor must be operated at a constant speed at the electrical angular velocity ωre that produces the current angular velocity ω in consideration of the slip angular velocity ωs.

In the case of an IM, the relationship between the torque amplitude components τu and τv and the Fourier coefficient C1 is a relationship shown in FIG. 4 in a similar manner to permanent magnet synchronous motors (SPMSM and IPMSM). Therefore, the torque ripple τrip of Formula (22) can be notated by Formula (23) using the torque amplitude components τu and τv.

[Expression 23]

$$\tau rip \approx B\{\tau_u S_{(\theta+\pi/3)} + \tau_v S_{(\theta)}\}$$ (23)

where B denotes a constant (B>0) for matching units between τrip and τu, τv in the case of an IM.

Since the relationship between τu and τv and the Fourier coefficient C1 is shown in FIG. 4, the relationship expressed by Formula (9.1) and Formula (9.2) is satisfied, and solving these simultaneous equations enable τu and τv to be expressed by Formula (10). In other words, in an IM, the sequence of (Step 5) which is an operation of the per-phase torque amplitude component calculating unit 3 shown in FIG. 2 is executed based on Formula (10). Thereafter, the sequence of (Step 6) and (Step 4) is also the same as in the case of permanent magnet synchronous motors (SPMSM and IPMSM) described earlier.

When the three-phase AC motor is a permanent magnet synchronous motor (SPMSM and IPMSM), the position control apparatus 20 similarly detects currents of two phases (the U phase and the V phase) among the currents of three phases which flow through the three-phase AC motor, applies offset compensation processing to the current detected values of the two phases based on offset compensation amounts duc [m] and dvc [m] obtained in advance, and controls the three-phase AC motor based on the current detected values of the two phases after the offset compensation processing.

The processing of obtaining the offset compensation amounts includes processing of obtaining a Fourier coefficient C1 of a frequency component of a torque ripple with respect to a torque command value signal (the torque command value signal τc* [n]) to the three-phase AC motor. The torque command value signal may be a signal indicating a torque command value with respect to the three-phase AC motor rotating at a constant speed. In addition, the processing of obtaining the offset compensation amounts duc [m] and dvc [m] includes processing of obtaining torque amplitude components (τu and τv) of the two phases of the three-phase AC motor. The processing of obtaining the torque amplitude components of the two phases includes processing of obtaining the torque amplitude components (τu and τv) of the two phases based on the Fourier coefficient C1 and an electrical angle θ0 of the three-phase AC motor at a reference time (n=0) of the torque command value signal τc* [n]. Furthermore, the processing of obtaining the offset compensation amounts includes processing of obtaining the offset compensation amounts duc [m] and dvc [m] with respect to the two phases based on the torque amplitude components (τu and τv) of the two phases.

In addition, the processing of obtaining the offset compensation amounts duc [m] and dvc [m] includes: processing of obtaining, based on the torque amplitude components (τu and τv) of the two phases, offset compensation change amounts (offset compensation increments Δduc and Δdvc) with respect to offset compensation amounts duc [m−1] and dvc [m−1] previously obtained with respect to the two phases, and obtaining new offset compensation amounts duc [m] and dvc [m] with respect to the two phases based on the offset compensation change amounts with respect to the two phases and the offset compensation amounts duc [m−1] and dvc [m−1] previously obtained with respect to the two phases. In this case, the U phase and the V phase (the V phase and the W phase) may be direct processing objects and processing of the W phase (U phase) may be executed based on calculation results of the U phase and the V phase (the V phase and the W phase).

As described above, with the position control apparatus 20 of a three-phase AC motor according to the present disclosure shown in FIG. 1, an appropriate per-phase offset compensation amount can be calculated and output and a magnitude of a torque ripple attributable to a current detection DC offset can be minimized both when a drive motor is a permanent magnet synchronous motor (SPMSM and IPMSM) and when the drive motor is an induction motor (IM) or a synchronous reluctance motor (SynRM) for which d-axis current command value id*≠0 is a prerequisite.

The invention claimed is:

1. A control apparatus of a three-phase AC motor, which detects currents of processing object phases being at least two phases among currents of three phases which flow through a three-phase AC motor,
   applies offset compensation processing with respect to current detected values of the processing object phases based on offset compensation amounts obtained in advance, and
   controls the three-phase AC motor based on the current detected values of the processing object phases after the offset compensation processing, wherein
   the processing of obtaining the offset compensation amounts includes:
   processing of obtaining a Fourier coefficient of a frequency component of a torque ripple with respect to a torque command value signal to the three-phase AC motor;
   processing of obtaining torque amplitude components of the processing object phases of the three-phase AC motor based on the Fourier coefficient and an electrical angle of the three-phase AC motor at a reference time of the torque command value signal; and
   processing of obtaining the offset compensation amounts with respect to the processing object phases based on the torque amplitude components of the processing object phases.

2. The control apparatus of a three-phase AC motor according to claim 1, wherein:
   the processing of obtaining the offset compensation amounts includes:
   processing of obtaining, based on the torque amplitude components of the processing object phases, offset compensation change amounts with respect to the offset compensation amounts previously obtained with respect to the processing object phases; and
   obtaining new offset compensation amounts with respect to the processing object phases based on the offset compensation change amounts with respect to the processing object phases and the offset compensation amounts previously obtained with respect to the processing object phases.

3. The control apparatus of a three-phase AC motor according to claim 1, wherein:
   the torque command value signal
   indicates a torque command value with respect to the three-phase AC motor rotating at a constant speed.

4. The control apparatus of a three-phase AC motor according to claim 2, wherein:
   the torque command value signal
   indicates a torque command value with respect to the three-phase AC motor rotating at a constant speed.

* * * * *